3,484,459
SEPARATION OF HEXITANS
Ludwig A. Hartmann, Wilmington, Del., assignor to Atlas Chemical Industries, Inc., Wilmington, Del., a corporation of Delaware
No Drawing. Filed Mar. 31, 1967, Ser. No. 627,318
Int. Cl. C07c 45/24, 47/18; C13k 9/00
U.S. Cl. 260—347.8                 11 Claims

ABSTRACT OF THE DISCLOSURE

A process of revolving mixtures of hexitans which comprises acetalizing a mixture of hexitans with an aldehyde or ketone, separating the acetalized mixture into its several components by conventional separation techniques, and regenerating the corresponding hexitan from the separated acetalized hexitans. The separation process relies on the differential reactivity of the various hexitans toward aldehydes and ketones. Due to the particular stereochemistry of the available hydroxy groups, some hexitans form diacetals, others form monoacetals, and still others are inert thereto. The components of the acetalization reaction have markedly different physical properties and are readily separated from each other by conventional methods of fractional distillation, extraction, or crystallization.

---

This invention relates to separation processes. More particularly, this invention relates to processes of separating mixtures of hexitans. Still more particularly, this invention relates to processes of resolving a mixture of hexitans obtained by dehydration of hexitol into its several components.

Acetal, as used throughout the specification and appended claims, includes both aldehyde-acetals and ketone-acetals.

When hexitol is heated in the presence of an anhydrization catalyst, such as mineral acid, a complex mixture of hexitans, isohexides, and unreacted hexitol is obtained. By fractional distillation under reduced pressure, hexitans as a group and isohexides as a group can be separated from each other and from unreacted hexitols. However, the hexitan fraction obtained is a mixture of several hexitans which differing only in the spatial arrangement of the hydroxyl groups, cannot be fully resolved into its individual components by conventional methods of fractional distillation, crystallization, or extraction. In addition, the presence of miscellaneous other by-products makes conventional isolation and recovery impossible.

It is, accordingly, an object of this invention to provide a simple economically feasible process of separating mixture of hexitans.

It is another object of this invention to provide a simple economically feasible process of resolving mixtures of hexitans obtained by anhydrization of hexitols into their several components.

It is another object of this invention to provide a simple economically feasible process of obtaining individual hexitans in substantially pure form.

Further objects of this invention will be apparent in the following description and in the appended claims.

The foregoing objects are broadly accomplished, according to the present invention, by the acetalization of a mixture of hexitans, separation of the acetalized product into its components by conventional separation techniques, and conversion of the separated acetalized components to the corresponding hexitan.

The present separation process relies on the differential reactivity of the various hexitans toward aldehydes and ketones in the presence of acidic catalysts. It was found that due to the particular stereochemistry of the available hydroxy groups some hexitans form diacetals, others form monoacetals, and still others are inert. The resulting components of the acetalization reaction thus have markedly different physical properties and lend themselves readily to separation from each other by conventional methods of fractional distillation, extraction, or crystallization.

The mixtures of hexitans to be separated, by the process of this invention, may conveniently be obtained by fractionally distilling, under vacuum, the mixture obtained in known manner by the acid catalyzed dehydration of hexitol. Any hexides formed in the dehydration process are relatively volatile and may conveniently be removed as a forerun before the higher boiling mixture of hexitans is collected. Unreacted hexitol is non-volatile and remains as a still residue.

The hexitan fraction, which is a mixture of several hexitans, is reacted with an aldehyde or ketone in the presence of an acid catalyst. The resulting product is a mixture of diacetals, monoacetals, and unreacted hexitans. The formation of diacetals requires the participation of all four available hydroxyl groups of a hexitan molecule. The formation of monoacetals selectively requires only two hydroxyl groups and thus leaves two hydroxyl groups unreacted. The other non-reacted hexitan, of course, remains with four hydroxyl groups. These differences in structure are reflected in pronounced differences in physical properties.

The diacetals have a relatively low boiling point, the monacetals have a substantially higher boiling point, and the unreacted hexitans are even less volatile. Thus, the mixture is readily separated into its individual components by fractional distillation. In addition to differences in boiling point, acetals of hexitans exhibit markedly different solubility characteristics. The diacetals are found to be soluble in non-polar solvents such as n-hexane, petroleum ether, and heptane whereas the monoacetals are insoluble in such solvents. More polar solvents, such as ethyl acetate, acetone, and ethyl ether, readily dissolve monoacetals but are without effect on unreacted hexitans. Based on these differential solubilities, an extraction process for separating the several components of the acetalized hexitan fraction can be readily set up.

The corresponding hexitans may then be recovered, if desired, in very high purity by acid hydrolysis of the separated acetal fractions and subsequent crystallization or evaporation.

The aldehyde or ketone employed for the preparation of the acetals, in accordance with the present invention, may be any aldehyde or ketone which yield acetals of hexitans which have pronounced differences in physical properties. Among the many aldehydes and ketones which are suitable for use in preparing the acetals of the present invention are formaldehyde, acetaldehyde, propionaldehyde, butyraldehyde, isobutyraldehyde, valeraldehyde, caproaldehyde, heptaldehyde, octanal, decanal, acrolein, chloral, acetone, methyl ethyl ketone, methyl n-propyl ketone, methyl isopropyl ketone, diethyl ketone, hexanone-2, hexanone-3, octanone-1, decanone-1, bromoacetone, acetylacetone acetonylacetone, and methyl vinyl ketone.

When high molecular weight aldehydes and ketones are employed, the separation of boiling points of monoacetal and diacetal tends to be narrow and boiling points are higher thus making a fractionation by distillation somewhat difficult. In such cases, separation by extraction is preferred. However, when low molecular weight aldehydes and ketones are employed, the boiling points of monoacetal and diacetal are well separated and lower, and fractional distillation is the preferred method of separation. The lower aldehydes and ketones, such as those containing from 1 to 6 carbon atoms, are preferred because they are less expensive than the higher molecular weight aldehydes and ketones and because fractional distillation is usually easier to perform on a large scale than fractional separation or crystallization which require large amounts of solvent. The preferred aldehyde is formaldehyde and the preferred ketone is acetone.

Among the many acid catalysts which are suitable for use in preparing the acetals are p-toluene sulfonic acid, sulfuric acid, hydrochloric acid, phosphoric acid, zinc chloride, cupric sulfate, phosphorus pentoxide, and ion-exchange resins in the acid form.

The invention will be more readily understood from a consideration of the following examples which are represented for illustrative purposes.

EXAMPLE 1

1000 grams (5.5 moles) of D-mannitol was placed in a two liter, 3-neck reaction flask provided with Claisen adapter, thermometer, stirrer, condenser, receiver, and Dry Ice trap. The charge was melted and stirred at 182° C. A solution of 2.5 grams concentrated sulfuric acid in 2.5 ml. water was slowly added at 175–178° C. After all the acid catalyst was added, the temperature was allowed to drop and water was distilled from the reaction mixture under vacuum. The temperature was adjusted to 150–155° C. at 30 mm. pressure and the reaction allowed to proceed for 33 minutes from the time the catalyst was added. Vacuum was then shut off and the product neutralized with 11.3 grams of 20% sodium hydroxide solution (10% excess) at 138° C. Additional water was removed at 180° C. and under vacuum for 17 minutes.

The crude anhydro product was heated and distilled under vacuum. Isomannide distilled at 137–143° C. and 0.2–0.25 mm. pressure. The hexitan fraction distilled at 180–238° C. and 0.5 mm. pressure.

The hexitan fraction was taken up in four volumes of boiling isopropanol and crystallized at room temperature and then at 0° C. Filtration yielded 123 grams (0.75 mole) of 1,4-mannitan. The mother liquor from the crystallization was evaporated to yield 405 grams of a syrupy mixture of hexitans.

A 390 gram portion of this mixture was stirred with 4 liters of acetone in the presence of 30 grams of p-toluene sulfonic acid for 16 hours. 80 grams of anhydrous magnesium sulfate was then added and the resulting mixture allowed to stand at room temperature for 3 days. The product was then neutralized with 33 grams of calcium hydroxide and filtered. Upon evaporation of the filtrate under vacuum at 70° C. there was obtained 482 grams of product.

The acetalized product was fractionally distilled under reduced pressure using a 15-inch column filled with Cannon packing. Fractions were collected throughout the distillation and analyzed by paper chromatography. Diacetal of 1,4-D-mannitan was collected at 79–96.5° C. and 0.4 mm. pressure. The diacetal of 1,4-D-mannitan had a melting point of 51–53° C. and a rotation of $(\alpha)_D^{25}$ −32.9° in ethanol. Diacetal of 1,5-D-mannitan was collected at 96.5–117° C. and 0.4 mm. pressure and had a melting point of 96–97° C. The monoacetal of 2,5-D-sorbitan distilled at 144–168° C. and 0.2–0.3 mm. pressure and had a melting point of 96–97° C. and a rotation of $(\alpha)_D^{25}$ +27.0° in ethanol. The residue remaining in the distillation flask was 2,5-D-sorbitan which had not been acetalated. Additional monoacetal of 2,5-D-sorbitan was recovered from this residue and the distillation residue of the crude anhydro product by the above acetalization and distillation route.

20 grams of the diacetal of 1,4-D-mannitan was mixed with 30 ml. water and 2.5 ml. acetic acid. The mixture was heated on a steam bath for 3 hours, transferred to separatory funnel, and extracted with chloroform. The colorless aqueous solution was then evaporated on a waterbath (70–80° C.) under aspirator vacuum to a viscous syrup. The syrup was dissolved in 70 ml. hot isopropanol and allowed to stand for four days. The crystals of 1,4-D-mannitan which formed were removed by filtration.

4 grams of the diacetal of 1,5-D-mannitan was mixed with 6 ml. water and 0.33 ml. acetic acid and heated on a steam bath for three hours. The resulting clear solution was extracted with chloroform and then evaporated for 2 hours at 70° C. and 15 mm. pressure. The product solidified on standing at room temperature. The solid product was dissolved in 110 ml. boiling isopropanol and cooled to room temperature. The crystals of 1,5-D-mannitan which formed were removed by filtration.

Fractional crystallization of the monoacetal fraction from methyl ethyl ketone yielded very large crystals of the rhombohedral type and fine needle-like crystals. The large crystals were less soluble in the methyl ethyl ketone than the fine needle crystals. Hydrolysis of the large crystals (MP 96–97° C.) yielded 2,5-D-sorbitan (M.P. 56–59° C. and rotation of $(\alpha)_D^{20}$ +24.4° in water) and hydrolysis of the fine needle crystals (M.P. 119–120° C., optically inactive) yielded 2,5-D, L-sorbitan as a syrup.

EXAMPLE 2

A sample of 657 grams of D-sorbitol was anhydrized in an apparatus similar to the described in Example 1 at 130–144° C. and 30 mm. pressure for 30 minutes in the presence of 0.2% sulfuric acid with the removal of 1.0 mole of water per mole of sorbitol charged. The crude product was distilled after neutralization to yield 7.8% dianhydrohexitol fraction (140–170° C., 0.4 mm.) and 80.9% monoanhydro hexitol fraction 180–240° C., 0.5 mm.).

Direct crystallization of the monoanhydro fraction from 5 volumes of isopropanol yielded crystalline 1,4-D-sorbitan in high purity. The syrupy mixture of hexitans from the mother liquor (163 grams) was treated at room temperature with 1500 ml. acetone containing 15 grams of p-toluene sulfonic acid for 24 hours. Treatment at room temperature was continued for 24 hours after addition of 20 grams of magnesium sulfate. After neutralization with 20 grams of solid calcium hydroxide, the acetals were recovered upon filtration and evaporation.

The acetalized product was fractionally distilled in a 15-inch column filled with Cannon packing. The diacetal was distilled at 79–111° C. and 0.1 mm. pressure, and the monoacetal was collected at 113–128° C., 0.1 mm. pressure.

The diacetal cuts were partially solidified at room temperature and the crystalline diacetal was recovered by filtration. Recrystallization from n-hexane yielded crystals having a melting point of 128–129° C. and a rotation of $(\alpha)_D^{20}$ +18° in ethanol. Hydrolysis in dilute acid solution and subsequent crystallization resulted in recovery of 2,5-L-iditan.

The monoacetal fraction was hydrolyzed in dilute acetic acid solution to regenerate crystalline 1,4-D-sorbitan.

EXAMPLE 3

A 250 ml. flask, equipped with thermometer, stirrer, condenser, and water separator was charged with a mixture of 10 grams of 1,4-sorbitan, 10 grams of 1,4-mannitan, and 5 grams of 2,5-mannitan, 200 ml. of methyl isobutyl ketone, and 50 mg. of p-toluene sulfonic acid. The mixture was heated for three hours at 110–118° C. while methyl isobutyl ketone-water azeotrope was collected at 106–115° C. The yield of water was 3.3 ml. The product solution was decanted from 5.0 grams of residue which was identified as 2,5-mannitan.

The solution was stirred with a mixed-bed ion-exchange resin and 4.4 grams unreacted hexitan isolated by filtration. This was identified as 1,4-sorbitan by melting point. The solvent was then evaporated and 26.0 grams of syrupy acetal isolated. The acetal mixture was taken up in 30 ml. hexane and the insoluble-portion removed. The hexane soluble product, 18.2 grams, was isolated after evaporation. This was identified as diacetal, corresponding to 9.1 grams of hexitan. 1,4-mannitan was recovered from the diacetal after hydrolysis and identified by melting point. The diacetal was distilled at 109–116° C. and 0.15 mm. of pressure.

The hexane-insoluble product was mixed with acetone and 1.3 grams 1,4-sorbitan, unacetalized, recovered by crystallization. Residue from crystallization was 3.7 grams of monoacetal which corresponds to 2 grams hexitan. This residue was distilled at 135–150° C. and 0.1 mm. pressure. Hydrolysis yielded 1,4-sorbitan.

EXAMPLE 4

A sample of mixed anhydro hexitol product, 520 grams, containing 1,4-sorbitan, 1,4-talitan, 2,5-iditan, 1,4-altritan, 2,5-mannitan, and 2,5-allitan, was treated with 2.5 liters methyl isobutyl ketone and 20 ml. 85% phosphoric acid at 115–122° C. for 78 hours. Methyl-isobutyl ketone-water azeotrope was collected, containing 95 ml. water. The solution was separated from unreacted hexitan, neutralized with excess calcium hydroxide, and washed with water to remove additional unreacted hexitans. A yield of 827 grams acetal was obtained upon evaporation. A preliminary separation by distillation gave 196 grams monoacetal as distillation residue and 623 grams diacetal-monoacetal mixture with a boiling point of 124–140° C. at 0.1 mm. pressure. Mono and di-acetals were separated by fractionation in a packed column which gave diacetals, 369 grams, distilling at 111–117° C. and 0.1 mm. pressure, and monoacetal residue. Hydrolysis of the diacetal fractions showed that the diacetal fraction consisted of 1,4-talitan and 2,5-iditan and the monoacetal fraction contained 1,4-altritan, 1,4-sorbitan, and 2,5-allitan.

EXAMPLE 5

A mixture of 10 grams 1,4-sorbitan, 10 grams 1,4-mannitan, and 5 grams 2,5-mannitan was dissolved in 25 ml. concentrated hydrochloric acid and 25 ml. 36% formaldehyde solution. The solution was heated on a steam bath for two hours and then stored at 0° C. for 16 hours before neutralization with sodium carbonate. The product was evaporated under vacuum at 50–60° C. and extracted with acetone. The acetone solution yielded 26.3 grams syrupy product. This product was distilled in a small packed column and 3.4 grams diacetal obtained at B.P. 85° C. and 0.2 mm. pressure (corresponding to 3 grams hexitan). The diacetal solidified and was found to melt at 53.5–55° C. after re-crystallization from benzene-hexane. Hydrolysis of the diacetal gave 1,4-mannitan, M.P. 142–144° C.

The residue from the separation of 1,4-mannitan dimethylene acetal was distilled at 125–140° C. and 0.2 mm. pressure to yield 8.8 grams monoacetal fraction (corresponding to 8.2 grams hexitan), partially crystallized. Treatment with methyl ethyl ketone gave 3.2 grams crystalline monoacetal (2.95 grams hexitans) which melted at 115–117° C. after recrystallization from methyl ethyl ketone. This was a monoacetal of 1,4-mannitan. The non-crystallized monoacetal (5.3 grams corresponding to 4.9 grams hexitan) was hydrolyzed to yield 1,4-sorbitan. 2,5-mannitan and the unreacted portion of 1,4-mannitan and 1,4-sorbitan were found in the residue from the separation of the acetals.

EXAMPLE 6

A sample of 204 grams L-iditol was anhydrized in an apparatus similar to that described in Example 1 at 125° and 27 mm. pressure for 35 minutes in the presence of 2.1 grams p-toluene sulfonic acid with the removal of 1.25 moles of water per mole of hexitol. The product was distilled after neutralization and 41% dianhydroiditol was obtained at 142–178°/0.2 mm. A fraction of syrupy monoanhydroiditol was then distilled at 185–238°/0.3 mm. in 50% yield. Residual unreacted hexitol was removed by precipitation with isopropanol and the isopropanol-soluble hexitan was then treated for 24 hrs. at room temperature with 600 ml. acetone containing 6 grams p-toluene sulfonic acid. The acetals were obtained after neutralization, filtration and evaporation.

The acetalized product was fractionally distilled in a 6″ column filled with Cannon packing. Hexitol triacetal and diacetal were distilled at 95–135°/0.2 mm. pressure, and monoacetal was collected at 136–140°/0.2 mm. pressure. The monoacetal was hydrolyzed in dilute acetic acid for 2 hours at 70° C. and 300 mm. pressure. Evaporation yielded crystalline 1,4-L-iditan. The product melted at 95–96° after recrystalization from isopropanol. The optical rotation was $(\alpha)^{25}_D$ —17.7° (C, 1.2; $H_2O$).

EXAMMPLE 7

A sample of 150 grams dulcitol was treated at 160–170°/100–400 mm. pressure for 1 hour in the presence of 0.25% sulfuric acid. About 1.2 moles of water per mole of dulcitol was liberated. The product was neutralized and treated for 24 hours at room temperature with 1400 ml. acetone containing 13 grams p-toluene sulfonic acid. A yield of 146 grams acetalized product was obtained after neutralization, filtration and evaporation. The acetals were distilled in a 7″ column filled with Cannon packing. A monoacetal fraction was obtained at 129–134°/0.2 mm. pressure. This monoacetal was hydrolyzed in dilute acetic acid and syrupy hexitan recovered after evaporation. Crystalline 1,4-D, L-dulcitan melting at 71–73° was obtained from a solution in a mixture of equal volumes methanol and acetone.

EXAMPLE 8

A sample of 20 grams D,L-talitol was anhydrized at 150°/35 mm. pressure in the presence of 1% p-toluene sulfonic acid and 1.62 moles of water per mole of talitol was liberated. Dianhydrohexitol was distilled at 140–168°/0.2 mm. (40%) and the residue was acetonated with 120 ml. acetone and 0.7 gram p-toluene sulfonic acid to yield 8 grams of acetal. Diacetal was distilled at 92–95°/0.3 mm. pressure and monoacetal was obtained at 120–145°/0.3 mm. pressure.

The diacetal was crystallized and was found to melt at 84–85°. Hydrolysis in dilute aqueous sulfuric acid, ion-exchange, and evaporation yielded syrupy 1,4-D, L-talitan. This compound melted at 94–95° after crystallization from isopropanol.

The monoacetal was hydrolyzed in dilute aqueous sulfuric acid. 1,4-anhydro-D,L-altritol was obtained after ion-exchange and evaporation.

EXAMPLE 9

A sample of 2 grams allitol was anhydrized at 125–150°/0.5 mm. in the presence of 40 milligrams p-toluene sulfonic acid. A yield of 44% dianhydrohexitol was obtained by distillation during the anhydrization.

The residue is acetonated in the presence of acetone and p-toluene sulfonic acid and the acetal obtained after neutralization and filtration. Diacetal is distilled at 85–100°/0.3 mm. pressure and crystallized to yield a product, melting at 42–44°. 1,4-D,L-allitan is obtained from this diacetal upon hydrolysis.

Hexitans are useful as intermediates in the preparation of various products, such as in the preparation of surface active agents by esterification with fatty acids or fatty esters. Illustratively, one mole of 1,4-D-mannitan may be reacted with one mole of a fatty acid, such as stearic acid, in the presence of a catalytic quantity of p-toluene sulfonic acid, such as 0.05% at approximately 200° C. in an inert atmosphere for about four hours to produce a surface active agent.

Although this invention has been described with reference to specific chemical materials, including specific hexitols, hexitans, aldehydes, ketones, anhydrization catalysts, acetalization catalysts, hydrolysis catalysts, and solvents as well as specific method steps, it will be appreciated that

What is claimed is:

1. A process for resolving mixtures of hexitans composed solely of carbon, hydrogen, and oxygen atoms which comprises
   (1) acetalizing a mixture of hexitans composed solely of carbon, hydrogen, and oxygen atoms with a compound selected from the group consisting of aldehydes and ketones,
   (2) separating the acetalized mixture into its several components, and
   (3) regenerating the corresponding hexitans from the separated acetalized hexitans.

2. The process of claim 1 wherein the said compound in (1) is aliphatic and contains from one to six carbon atoms.

3. The process of claim 2 wherein the compound is acetone.

4. The process of claim 2 wherein the compound is formaldehyde.

5. The process of claim 2 wherein the acetalized mixture is separated into its several components by fractional distillation.

6. The process of claim 2 wherein the acetalized mixture is separated into its several components by fractional crystallization from a solvent.

7. The process of claim 2 wherein the acetalized mixture is separated into its several components by fractional separation from a solvent.

8. The process of claim 7 wherein the solvent is selected from the group consisting of n-hexane, water, petroleum ether, heptane, diethyl ether, ethyl acetate, and acetone.

9. The process of claim 2 wherein the mixture of hexitans is obtained by partial dehydration of hexitol in the presence of an acid catalyst.

10. The process of claim 9 wherein
    (1) the mixture of hexitans is reacted with acetone in the presence of an acid acetonation catalyst.
    (2) The acetalized mixture is separated into monoacetonate, diacetonate, and non-acetonate fractions by fractional distillation, and
    (3) The monoacetonate and diacetonate fractions are hydrolyzed to the corresponding hexitans.

11. The process of claim 10 wherein the hexitol is selected from the group consisting of sorbitol, mannitol, iditol, dulcitol, talitol, and allitol.

References Cited

Vargha et al., Chem. Berichte, vol. 93, p. 1608–1616 (1960).

Montgomery et al., J. Chem., Soc. (1948) p. 2204–2207.

ALEX MAZEL, Primary Examiner

BERNARD I. DENTZ, Assistant Examiner

U.S. Cl. X.R.

260—340.5, 340.9